United States Patent [19]
Wolters et al.

[11] Patent Number: 5,263,690
[45] Date of Patent: Nov. 23, 1993

[54] APPARATUS FOR METALLURGICAL TREATMENT OF MOLTEN STEEL

[75] Inventors: Günter Wolters, Düsseldorf; Willi Stempel, Oberhausen; Gerhard Juenemann, Bochum, all of Fed. Rep. of Germany

[73] Assignee: Man Gutehoffnungshütte, Oberhausen, Fed. Rep. of Germany

[21] Appl. No.: 837,253

[22] Filed: Feb. 14, 1992

[30] Foreign Application Priority Data

Feb. 18, 1991 [DE] Fed. Rep. of Germany ....... 4104910

[51] Int. Cl.$^5$ ............................................. C21C 5/40
[52] U.S. Cl. ................... 266/159; 266/165; 266/208; 373/9
[58] Field of Search ............... 266/144, 159, 208, 165; 373/9, 60, 73, 77, 78, 102

[56] References Cited

U.S. PATENT DOCUMENTS 3,826,646  7/1974  Karlsson et al. ..................... 266/165
4,459,697  7/1984  Bretthauer et al. ................. 373/102

FOREIGN PATENT DOCUMENTS 60-13017  1/1985  Japan .................................... 266/208

Primary Examiner—Melvyn J. Andrews
Attorney, Agent, or Firm—McGlew and Tuttle

[57] ABSTRACT

A unit for the metallurgical treatment of molten steel, located in steel teeming ladles, by heating and vacuum treatment. The ladle-metallurgical treatment unit serves for the mutual treatment of steel meltings by heating and vacuum treatment. It consists of two treatment stations, each of which is provided with a stationary tank 1, 2 for incorporating the steel teeming ladle 3, 4, and each is provided with a laterally movable vacuum lid mechanism 13. A heating device with a swiveling heating lid 9, which is arranged centrally between the two treatment stations, is brought into the working position over one of the two steel teeming ladles 3, 4. The invention provides a concentrated arrangement of the treatment stages for two steel teeming ladles, wherein only one heating device is required for heating, only one vaccum pump unit is required for the vacuum treatment, the treatment times and transport times of the steel teeming ladle between melting vessel, treatment unit and continuous teeming unit are shortened such that a continuous steel production, including its treatment, and longer teeming sequences in the continuous teeming unit are made possible.

10 Claims, 4 Drawing Sheets

APPARATUS FOR METALLURGICAL TREATMENT OF MOLTEN STEEL

FIELD OF THE INVENTION

The present invention pertains to a unit for the metallurgical treatment of molten steel, located in steel teeming ladles, by heating and vacuum treatment.

BACKGROUND OF THE INVENTION

In previously known ladle-metallurgical units for heating and vacuum operation, it is customary to provide a special treatment stage for each of the treatments mentioned, in which the steel teeming ladle to be treated is brought into the respective treatment position by means of corresponding transport mechanisms (crane or shifting vehicle).

The treatment times attained in the heating and vacuum unit and the transport times between the melting vessel, which can consist of at least one converter unit or at least one electric arc furnace, including the metallurgical treatment units up to the teeming mechanisms, for example, a continuous teeming unit, do not make a continuous teeming operation possible. Barely more than 1-2 meltings can be cast in the so-called sequence teeming.

A longer sequence teeming of, for example, ten meltings, cast one after the other, is only possible if the melting and treatment times in the individual units, including the transport times, as well as necessary auxiliary process times, are shorter or equal to the teeming time of a steel teeming ladle in the continuous teeming unit.

In the case of single teeming or short sequences, the continuous teeming unit must be newly prepared for the next teeming after completion of a teeming. These preparation times can amount up to thirty or more minutes and reduce productivity or hourly capacity of the entire steel plant due to these conditional downtimes in operation.

SUMMARY AND OBJECTS OF THE INVENTION

It is an object of the present invention to shorten the heating and vacuum treatment of steel, which is liquid but not yet prepared for teeming, necessary for continuous steel production and achievement of longer continuous teeming sequences.

According to the invention, a unit for metallurgical treatment of the molten steel located in steel teeming ladles is provided. The apparatus or unit provides a heating treatment and a vacuum during the treatment process. The metallurgic treatment unit includes two stationary tanks wherein steel teeming ladles are positioned within the tanks or incorporated in the tanks. A single heating device is provided including a transformer, a swiveling device with an electric supply. A raisable and lowerable support structure is provided for the power supply and connected electrodes. A flue-suction pipe is provided as well as a raisable and lowerable tank furnace lid. The arrangement allows the heating structure to be manipulated for mutual heating of both steel teeming ladles. Further, a single evacuation device is provided with at least one laterally movable, raisable and lowerable vacuum lid for vacuum treatment of both steel teeming ladles.

The swiveling device is motor driven and carries the tank furnace lid which is arranged centrally between the two tanks. This arrangement is supported in a front part by means of rollers on a support structure for swiveling about a swivel point. The suction pipe is arranged on the swiveling device and is connected on one end to a stationary collecting pipe via a swivel joint and is connected on the other end flush joined together with the flue gas connecting piece of the tank furnace lid during the heating process. The evacuation device is designed as a movable support structure with means for lowering and lifting the vacuum lid. The two stationary tanks are preferably each provided with a vacuum suction pipe wherein the vacuum suction pipes are connected to a central vacuum suction pipe of a common vacuum pump unit via at least one shut-off or reversing mechanism. At least one movable device is provided equipped with means for putting on and taking off holding lids wherein a holding lid is provided for both steel teeming ladles.

By means of the concentrated arrangement of the treatment stage for two steel teeming ladles, it is achieved that only one heating device (also called tank furnace) is necessary for heating, and only one vacuum pump unit is necessary for evacuating.

In the exemplified embodiment described below, the evacuation device has two vacuum lids.

If necessary, the single evacuation device manages with only one vacuum lid. In addition, the evacuation device, which is provided advantageously movable on guide rails, must be designed with respect to its travel path such that it is driven alternately from one treatment stage to another. Thus, it is taken into account that the heating device, located between the two treatment stages, is by-passed or crossed.

The treatment devices are used by swinging the heating device to the side or by reversing the power supply to the vacuum pump unit alternately for heating or evacuating.

The device according to the present invention can be installed in existing steelmaking plants. Since a smaller space requirement is necessary, the device can also be implemented in plants with restricted space conditions with low expenditure for the installation.

The essential advantage in using the treatment stage according to the present invention for two steel teeming ladles, filled with molten steel, is to avoid the transfer, required in prior-art units, of the steel teeming ladles between the treatment processes of heating and evacuating, to further minimize the temperature losses of the liquid steel during treatment and transportation, to carry out sequence teemings of more than two melts in the continuous teeming unit, and to use the preparation times of the continuous teeming unit thus recovered for increased steel production.

The number of melts, which can be cast in sequences, are no longer dependent on influence factors or disturbances in operation, but rather are only dependent on the quality program (steel analysis), including the required measurements of the cast steel (width × height).

The course of the ladle treatment in the unit according to the present invention includes the following possible treatment steps:

Phase 1: Heating (ladle furnace treatment)
Place ladle into vacuum tank/vessel
Kill the melt
Slag formation and stirring with inert gases
Take sample and temperature
Remove ladle cover Swing the ladle furnace roof into the heating position
Heat
Swing out the ladle furnace roof
Take temperature
Put on ladle cover.
Phase 2: Evacuate (vacuum treatment)
Move in and lower the vacuum cover
Evacuate for low-vacuum and deep-vacuum
Flood the tank
Take temperature and sample
Add alloys and stir
Trim analysis
Raise vacuum cover and remove
Lift out the covered ladle from the treatment tank and transport it to the continuous teeming unit.

The treatment steps mentioned here are preferably carried out in the above-mentioned sequence. Individual steps of the treatment such as, e.g., stirring, measuring the temperature or taking a sample, flooding the tank, etc., can be repeated or carried out in another sequence.

The total time of a metallurgical treatment amounts to between 75 and 85 minutes, in which the treatment of the molten masses in the ladle furnace unit lies in the first half of the treatment, and the treatment in the vacuum device lies in the second half of the treatment. Therefore, with corresponding observance of the sequence time, it is guaranteed that overlapping between the ladle furnace treatment (heating) and the vacuum treatment cannot occur. On the other hand, the selected arrangement of the devices and the step-by-step course of the heating and vacuum treatment allows the certain observance of a greater number of teeming sequences on the continuous teeming unit provided in the exemplified embodiment.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
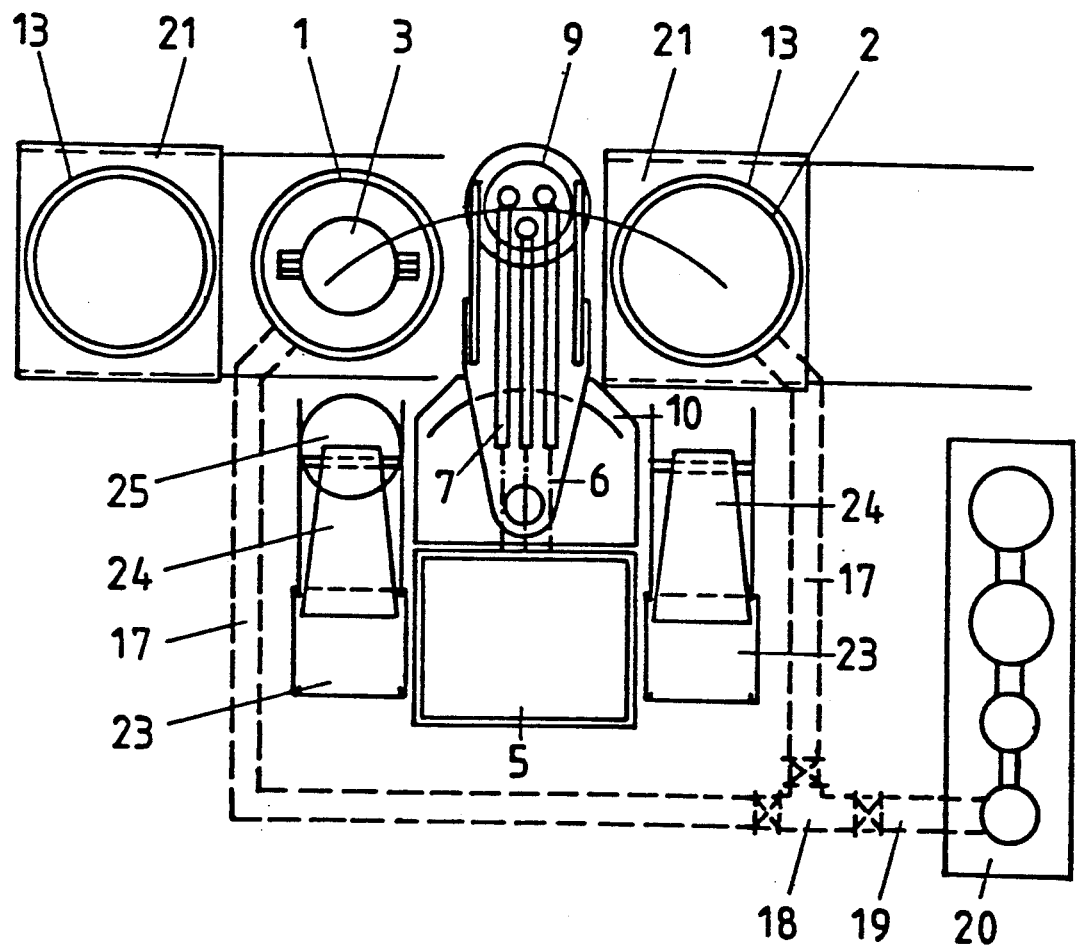
FIG. 1 is a schematic top view of the metallurgical treatment unit according to the invention.

The metallurgical steel treatment unit shown in FIG. 1 includes two stationary treatment stages, i.e., tanks 1, 2, which essentially consist of a vessel, which is open towards the top, for receipt of the steel teeming ladles 3, 4 to be treated. The tanks 1, 2 can be sealed with a vacuum lid 13, supported by vacuum cover support structure 21, that can be raised and lowered via lifting and lowering mechanism 22, as well as moved laterally. A heating device is provided including a raisable and lowerable ladle furnace cover 9, which is arranged centrally between the two treatment stages, including an electric power supply 7 and a transformer 5, i.e., the electrode supporting arm structure for the power supply 7. A central exhaust system is provided in the form of the flue gas suction pipe 8, which is pivotably arranged about a swivel point 12 and which can be brought into the working position over one of the two treatment stations (stationary tanks 1, 2,) tank 1 in the exemplified embodiment.

The execution of the unit provides that, for the steel treatment to be carried out in sequence, which essentially consists of heating, evacuating and degassing, including analysis adjustment by alloying and temperature adjustment, the two stationary tanks 1, 2, up to a common shut-off valve and reversing valve (common shut-off valve reversing device) 18, are each connected to a vacuum suction pipe 17 and then to only one individual vacuum pump unit 20 via a central vacuum suction pipe 19.

For the removal of the flue gases, which are produced when heating the melt with the electrodes 9a of the raisable and lowerable ladle furnace cover 9, a flue gas suction pipe 8, which is connected via a swivel joint 14 to a stationary collecting pipe 15, is integrated in the swiveling device 6.

The melt coming from a converter or an electric arc furnace is covered in the steel teeming ladle 3, 4 with a holding lid 25 which is insulated with fireproof material.

For taking off and putting on this holding lid 25 before or after heating the melt, a movable device 23, which is mounted on guide rails, with a put-on and take-off device 24 for the holding lid 25 is provided in the exemplified embodiment for each treatment stage (tanks 1, 2).

If necessary, instead of a device mounted on guide rails, a railless vehicle (not shown) can also be used for handling the holding lid. Such a vehicle can travel to alternating locations.

FIG. 1 also shows the operating state, in which the teeming ladle 3 was placed in the treatment stage (tank 1) and the holding lid 25 was removed by the put-on and take-off device 24.

Figure 2:
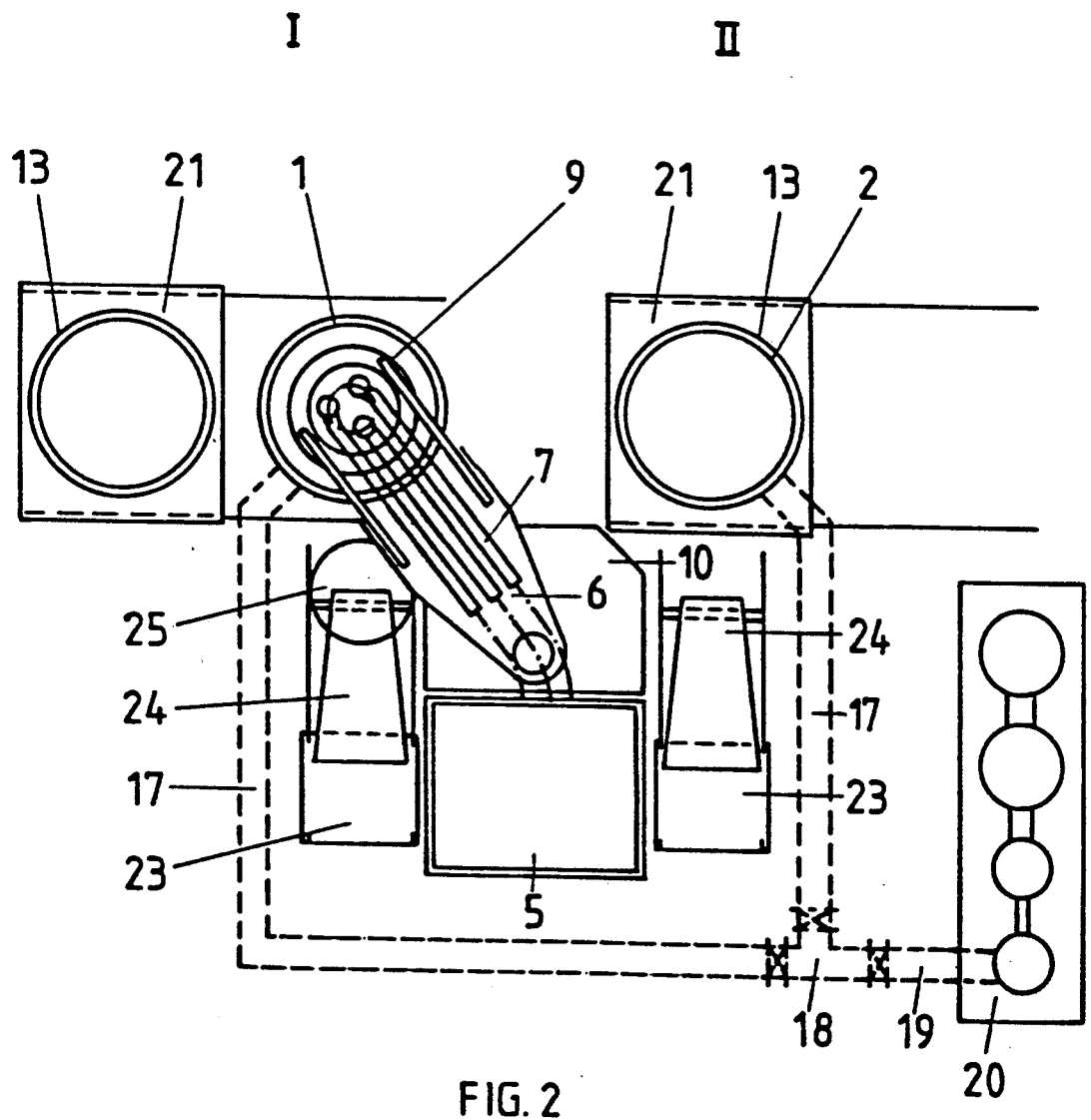
FIG. 2 is a schematic top view of the metallurgical treatment unit, in which both treatment stages are in operating position.

FIG. 2 shows the metallurgical treatment unit in another operating position, in which the teeming ladle 3 is heated in the treatment stage (tank 1), and the teeming ladle 4 in the treatment stage (tank 2) is subjected to the vacuum treatment.

Figure 3:
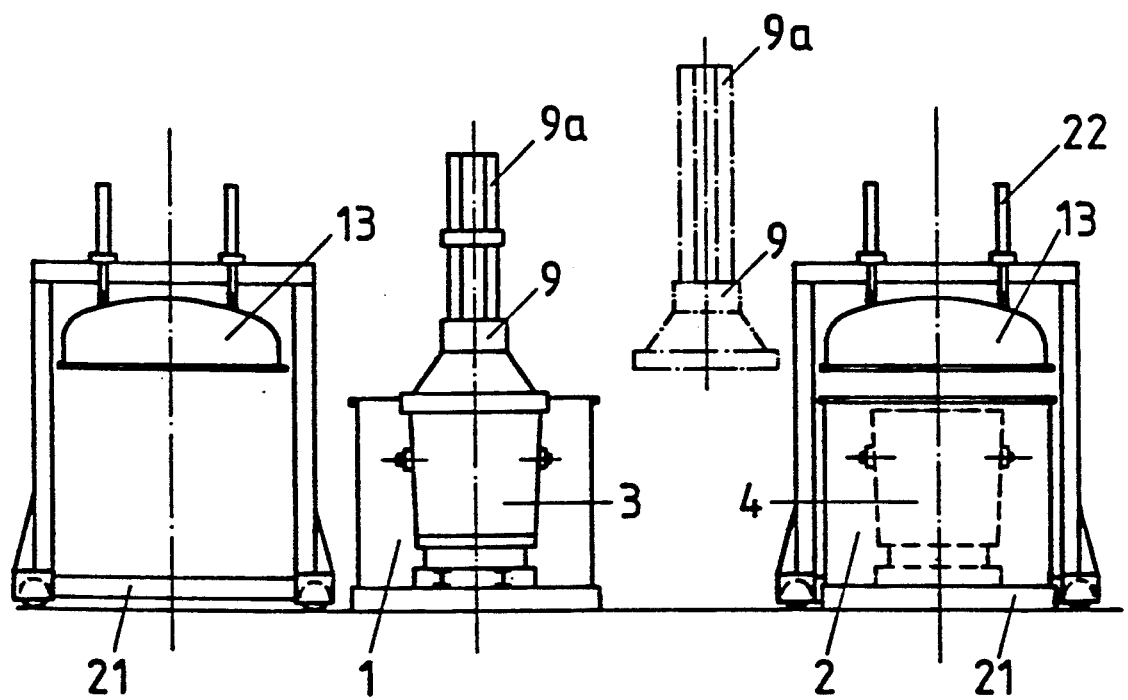
FIG. 3 is a longitudinal sectional view through the treatment unit.

FIG. 3 shows a longitudinal section through the treatment unit according to FIG. 2. The teeming ladle 3 in the tank 1 is heated by the electrodes of the raisable and lowerable ladle furnace cover 9, while the teeming ladle 4 in the tank 2 (shown in broken lines) is subjected to the vacuum treatment.

Figure 4:
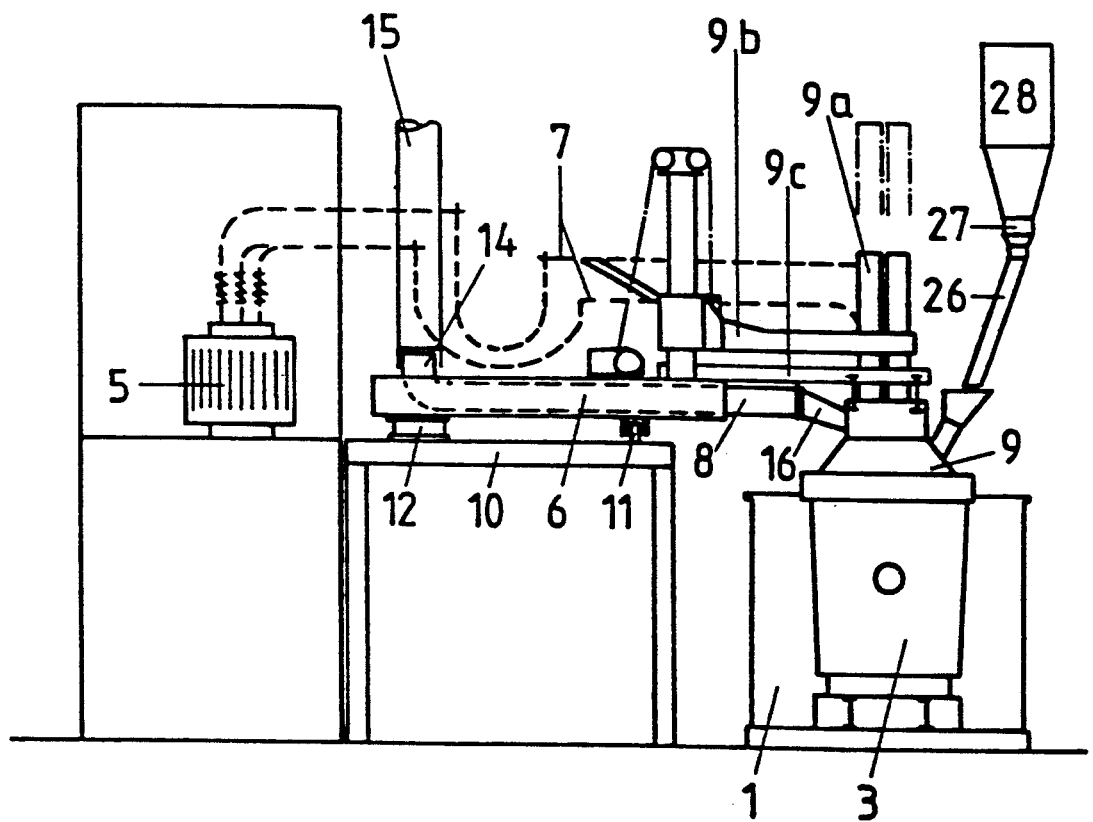
FIG. 4 is a cross section of the heating device (ladle furnace unit) arranged in a swivelling manner.

FIG. 4 shows a cross section of the entire heating device in the heating position. The ladle furnace cover 9 is located above the teeming ladle 3, which was placed in the tank 1. The ladle furnace cover has a double circular edge on the lower side, with which it encompasses, without contact, the upper edge of the steel teeming ladle in a labyrinth manner. The heating device, shown here in the working position, consists of the swiveling device 6 with ladle furnace lid 9, the lifting and lowering device for the electrodes 9c, as well as the lifting and lowering device for the ladle furnace cover 9c, which is supported in the front part by means of rollers 11 on a support structure 10. The swiveling device 6 can be rotated about a swivel point 12 into the respective working or waiting position.

A flue gas suction pipe 8 is connected to the stationary collecting pipe 15 via a swivel joint 14. During the heating process, the flue gas connecting piece 16 of the ladle furnace cover 9 is brought together flush with the flue gas suction pipe 8.

During the steel treatment, either when heating or during the vacuum treatment, flux powders for slag formation and alloy agents for the adjustment of the final analysis of the treated, molten steel are added via a rotatably arranged pipe 26 from a common group of bins 28 over corresponding metering devices 27.

While a specific embodiment of the invention has been shown and described in detail to illustrate the application of the principles of the invention, it will be understood that the invention may be embodied otherwise without departing from such principles.

What is claimed is:

1. A unit for metallurgical treatment of molten steel located in steel teeming ladles, comprising: a first stationary tank and a second stationary tank, said second stationary tank being positioned adjacent said first stationary tank; steel teeming ladles, said stationary tanks being dimensioned to receive one of said steel teeming ladles; movable heating means including a ladle furnace cover, a transformer, a swiveling device, an electric power supply connected to said transformer, electrodes connected to said electric power supply and connected to said ladle furnace cover and a raisable and lowerable support structure connected to said swivelling device and supporting said electrodes and said ladle furnace cover, said heating means for heating one of said steel teeming ladles upon engaging said ladle furnace cover with one of said steel teeming ladles said heating means including a flue gas suction pipe connected to said ladle furnace cover; evacuation means including a single evacuation device with a laterally movable, raisable and lowerable vacuum cover, a suction pipe connected to each of said first stationary tank and said second stationary tank and connected to one common vacuum pump unit via a central vacuum suction pipe and a common shut off valve reversing device said evacuation means for positioning said evacuation device for mutual vacuum treatment of both steel casting ladles.

2. A unit according to claim 1, further comprising a motor connected to said swivelling device for driving said swivelling device, said swivelling device being positioned centrally between said stationary tanks, said swivelling device with said ladle furnace cover being supported in a front part by means of rollers engaging a support structure, said swivelling device being positioned for swivelling about a swivel point.

3. A unit according to claim 1, wherein said flue gas suction pipe is arranged on said swivelling device, connected on one end to a stationary collecting pipe via a swivelling joint, and connected flush with a flue gas connecting piece of said ladle furnace cover on another end, for suction of flue gas during the heating process.

4. A unit according to claim 2, wherein said flue gas suction pipe is arranged on said swivelling device, connected on one end to a stationary collecting pipe via a swivelling joint, and connected flush with a flue gas connecting piece of said ladle furnace cover on another end, for suction of flue gas during the heating process.

5. A unit according to claim 1, wherein said evacuation means formed as a movable support structure including means for lowering and lifting said vacuum cover.

6. A unit according to claim 1, further comprising at least one movable means including a mechanism for placing on and taking off holding lids for each of said steel casting ladles.

7. A unit for metallurgical treatment of molten steel located in steel teeming ladles, comprising:
a first stationary tank;
a second stationary tank;
said second stationary tank being positioned adjacent to said first stationary tank;
steel teeming ladles, said first stationary tank and said second stationary tank each being dimensioned to receive one of said steel teeming ladles;
moveable heating means for heating the contents of one of said steel ladles, said moveable heating means including a swivelling device, a support connected to said swivelling device and moveable with respect to said swivelling device, a ladle furnace cover connected to said support, electrodes connected to said cover, an electric power supply connected to said electrodes and a transformer connected to said electric power supply, said support including means for raising and lowering said lid with respect to ladles positioned within said first stationary tank and said second stationary tank, said heating means including a flue gas suction pipe connected to said ladle furnace cover; and
evacuation means including a raisable and lowerable vacuum cover, a first suction pipe connected to said first stationary tank, and a second suction pipe connected to said second stationary tank, said first suction pipe and said second suction pipe being connected to a common vacuum pipe unit via a central vacuum suction pipe and a common shut off valve reversing device.

8. A unit according to claim 7, further comprising:
a motor connected to said swivelling device, said swivelling device being positioned centrally between said first stationary tank and said second stationary tank wherein said motor moves said support structure between said first stationary tank and said second stationary tank, said support structure being at least partially supported on rollers for facilitating swivelling between said first stationary tank and said second stationary tank.

9. A unit according to claim 7, wherein:
said flue gas suction pipe is supported on said swivelling device, said flue gas suction pipe is connected on a first end to a stationary collecting pipe via a swivelling joint and connected flush with a flue gas connecting piece of said ladle furnace cover on another end, for removable of flue gas during a heating process.

10. A unit according to claim 7, wherein:
said evacuation means is formed as a moveable support structure including means for lowering and lifting said vacuum cover.

* * * * *